United States Patent
O'Mahony et al.

(10) Patent No.: US 11,080,032 B1
(45) Date of Patent: Aug. 3, 2021

(54) CONTAINERIZED INFRASTRUCTURE FOR DEPLOYMENT OF MICROSERVICES

(71) Applicant: Forcepoint, LLC, Austin, TX (US)

(72) Inventors: Finbar O'Mahony, Cork (IE); Darren Meehan, Donegal (IE); Samuel Mark O'Neill, Cork (IE); Timothy Hourigan, Cork (IE); Eoin Hegarty, Cork (IE)

(73) Assignee: Forcepoint LLC, Austin, TX (US)

( * ) Notice: Subject to any disclaimer, the term of this patent is extended or adjusted under 35 U.S.C. 154(b) by 0 days.

(21) Appl. No.: 16/836,790

(22) Filed: Mar. 31, 2020

(51) Int. Cl.
| | |
|---|---|
| *G06F 8/65* | (2018.01) |
| *G06F 8/71* | (2018.01) |
| *H04L 29/08* | (2006.01) |
| *G06F 9/445* | (2018.01) |
| *G06F 9/44* | (2018.01) |
| *G06F 8/60* | (2018.01) |

(52) U.S. Cl.
CPC ....................... *G06F 8/60* (2013.01)

(58) Field of Classification Search
CPC .. G06F 9/445; G06F 9/44526; G06F 11/1433; G06F 11/07; G06F 8/65; G06F 8/658; G06F 8/60; G06F 8/61; G06F 8/71; G06F 8/34; G06F 8/36; G06F 9/45558; G06F 3/0485; G06F 3/04842; G06F 3/0483; G06F 40/106; G06F 40/186; H04L 67/34; H04L 9/3239; H04L 9/0637
See application file for complete search history.

(56) References Cited

U.S. PATENT DOCUMENTS

| | | |
|---|---|---|
| 6,072,875 A | 6/2000 | Tsudik |
| 7,107,447 B2 | 9/2006 | Sanin et al. |
| 7,694,150 B1 | 4/2010 | Kirby |
| 7,725,565 B2 | 5/2010 | Li et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,826,443 B1 | 9/2014 | Raman et al. |

(Continued)

FOREIGN PATENT DOCUMENTS

| | | |
|---|---|---|
| WO | 2019153581 A1 | 8/2019 |
| WO | WO-2019153581 A1 | 8/2019 |

OTHER PUBLICATIONS

Singh et al., Container-based microservice architecture for cloud applications, 6 pages (Year: 2017).*

(Continued)

*Primary Examiner* — Thuy Dao (74) *Attorney, Agent, or Firm* — Terrile, Cannatti & Chambers; Emmanuel A. Rivera (57) ABSTRACT

A method, system and computer-usable medium for containerized deployment of microservices used to deploy a product or service, such as a software application running on an information handling system is described. Artifacts related to particular versions of the one or more microservices are determined. An immutable container of the artifacts is created and provided to one more environments using the same configuration of the product or service. The container is deployed in the environments during release of the product or service.

17 Claims, 4 Drawing Sheets

(56) References Cited

U.S. PATENT DOCUMENTS

| | | | |
|---|---|---|---|
| 8,892,690 | B2 | 11/2014 | Liu et al. |
| 8,990,930 | B2 | 3/2015 | Burrell et al. |
| 9,015,812 | B2 | 4/2015 | Plattner et al. |
| 9,015,847 | B1 | 4/2015 | Kaplan et al. |
| 9,043,905 | B1 | 5/2015 | Allen et al. |
| 9,137,318 | B2 | 9/2015 | Hong |
| 9,166,999 | B1 | 10/2015 | Kulkarni et al. |
| 9,246,941 | B1 | 1/2016 | Gibson et al. |
| 9,262,722 | B1 | 2/2016 | Daniel |
| 9,342,553 | B1 | 5/2016 | Fuller |
| 9,485,266 | B2 | 11/2016 | Baxley et al. |
| 9,542,650 | B2 | 1/2017 | Lospinoso et al. |
| 9,596,146 | B2 | 3/2017 | Coates et al. |
| 9,665,854 | B1 | 5/2017 | Burger et al. |
| 9,692,762 | B2 | 6/2017 | Barkan et al. |
| 9,755,913 | B2 | 9/2017 | Bhide et al. |
| 9,762,582 | B1 | 9/2017 | Hockings et al. |
| 9,798,883 | B1 | 10/2017 | Gil et al. |
| 9,935,891 | B1 | 4/2018 | Stamos |
| 9,977,824 | B2 | 5/2018 | Agarwal et al. |
| 10,096,065 | B2 | 10/2018 | Little |
| 10,187,369 | B2 | 1/2019 | Caldera et al. |
| 10,237,298 | B1 | 3/2019 | Nguyen et al. |
| 10,270,794 | B1 | 4/2019 | Mukerji et al. |
| 10,275,671 | B1 | 4/2019 | Newman |
| 10,282,702 | B2 | 5/2019 | Paltenghe et al. |
| 10,284,601 | B1 | 5/2019 | Bar-Menachem et al. |
| 10,320,813 | B1 | 6/2019 | Ahmed et al. |
| 10,341,391 | B1 | 7/2019 | Pandey et al. |
| 10,417,454 | B1 | 9/2019 | Marom et al. |
| 10,417,653 | B2 | 9/2019 | Milton et al. |
| 10,419,428 | B2 | 9/2019 | Tunnell et al. |
| 10,432,669 | B1 | 10/2019 | Badhwar et al. |
| 10,545,738 | B1 * | 1/2020 | Jaeger .................. G06F 8/36 |
| 10,579,281 | B2 | 3/2020 | Cherubini et al. |
| 10,713,934 | B2 | 7/2020 | Sayavong et al. |
| 2002/0112015 | A1 | 8/2002 | Haynes |
| 2002/0123865 | A1 | 9/2002 | Whitney et al. |
| 2004/0034582 | A1 | 2/2004 | Gilliam et al. |
| 2004/0044613 | A1 | 3/2004 | Murakami et al. |
| 2005/0198099 | A1 | 9/2005 | Motsinger et al. |
| 2005/0273850 | A1 | 12/2005 | Freund |
| 2006/0048209 | A1 | 3/2006 | Shelest et al. |
| 2006/0053476 | A1 | 3/2006 | Bezilla et al. |
| 2006/0112111 | A1 | 5/2006 | Tseng et al. |
| 2006/0117172 | A1 | 6/2006 | Zhang et al. |
| 2006/0129382 | A1 | 6/2006 | Anand et al. |
| 2006/0195905 | A1 | 8/2006 | Fudge |
| 2006/0206449 | A1 * | 9/2006 | Fletcher .................. G06F 8/65 |
| 2006/0225124 | A1 | 10/2006 | Kolawa et al. |
| 2007/0043703 | A1 | 2/2007 | Bhattacharya et al. |
| 2007/0121522 | A1 | 5/2007 | Carter |
| 2007/0225995 | A1 | 9/2007 | Moore |
| 2007/0234409 | A1 | 10/2007 | Eisen |
| 2008/0168002 | A1 | 7/2008 | Kagarlis et al. |
| 2008/0168135 | A1 | 7/2008 | Redlich et al. |
| 2008/0168453 | A1 | 7/2008 | Hutson et al. |
| 2008/0198453 | A1 | 8/2008 | LaFontaine et al. |
| 2008/0244741 | A1 | 10/2008 | Gustafson et al. |
| 2009/0006888 | A1 | 1/2009 | Bernhard et al. |
| 2009/0182872 | A1 | 7/2009 | Hong |
| 2009/0228474 | A1 | 9/2009 | Chiu et al. |
| 2009/0300712 | A1 | 12/2009 | Kaufmann et al. |
| 2010/0057662 | A1 | 3/2010 | Collier et al. |
| 2010/0058016 | A1 | 3/2010 | Nikara et al. |
| 2010/0094767 | A1 | 4/2010 | Miltonberger |
| 2010/0094818 | A1 | 4/2010 | Farrell et al. |
| 2010/0107255 | A1 | 4/2010 | Elland et al. |
| 2010/0146622 | A1 | 6/2010 | Nordstrom et al. |
| 2010/0205224 | A1 | 8/2010 | Palanisamy et al. |
| 2010/0275263 | A1 | 10/2010 | Bennett et al. |
| 2011/0061093 | A1 | 3/2011 | Korkus et al. |
| 2011/0167105 | A1 | 7/2011 | Ramakrishnan et al. |
| 2011/0307957 | A1 | 12/2011 | Barcelo et al. |
| 2012/0046989 | A1 | 2/2012 | Baikalov et al. |
| 2012/0047575 | A1 | 2/2012 | Baikalov et al. |
| 2012/0079107 | A1 | 3/2012 | Williams et al. |
| 2012/0110087 | A1 | 5/2012 | Culver et al. |
| 2012/0137367 | A1 | 5/2012 | Dupont et al. |
| 2012/0210158 | A1 | 8/2012 | Akiyama et al. |
| 2012/0259807 | A1 | 10/2012 | Dymetman |
| 2013/0013550 | A1 | 1/2013 | Kerby |
| 2013/0054433 | A1 | 2/2013 | Giard et al. |
| 2013/0081141 | A1 | 3/2013 | Anurag |
| 2013/0097662 | A1 | 4/2013 | Pearcy et al. |
| 2013/0102283 | A1 | 4/2013 | Lau et al. |
| 2013/0132551 | A1 | 5/2013 | Bose et al. |
| 2013/0174259 | A1 | 7/2013 | Pearcy et al. |
| 2013/0238422 | A1 | 9/2013 | Saldanha |
| 2013/0297729 | A1 * | 11/2013 | Suni .................. G06F 21/629 |
| | | | 709/217 |
| 2013/0305358 | A1 | 11/2013 | Gathala et al. |
| 2013/0317808 | A1 | 11/2013 | Kruel et al. |
| 2013/0320212 | A1 | 12/2013 | Valentino et al. |
| 2013/0340035 | A1 | 12/2013 | Uziel et al. |
| 2014/0075004 | A1 | 3/2014 | Van Dusen et al. |
| 2014/0096215 | A1 | 4/2014 | Hessler |
| 2014/0199663 | A1 | 7/2014 | Sadeh-Koniecpol et al. |
| 2014/0205099 | A1 | 7/2014 | Christodorescu et al. |
| 2014/0214938 | A1 | 7/2014 | Bhatt et al. |
| 2014/0283075 | A1 | 9/2014 | Drissel et al. |
| 2014/0325634 | A1 | 10/2014 | Iekel-Johnson et al. |
| 2015/0082430 | A1 | 3/2015 | Sridhara et al. |
| 2015/0113646 | A1 | 4/2015 | Lee et al. |
| 2015/0154263 | A1 | 6/2015 | Boddhu et al. |
| 2015/0161386 | A1 | 6/2015 | Gupta et al. |
| 2015/0199511 | A1 | 7/2015 | Faile, Jr. et al. |
| 2015/0199629 | A1 | 7/2015 | Faile, Jr. et al. |
| 2015/0205954 | A1 | 7/2015 | Jou et al. |
| 2015/0215325 | A1 | 7/2015 | Ogawa |
| 2015/0220625 | A1 | 8/2015 | Cartmell et al. |
| 2015/0256550 | A1 | 9/2015 | Taylor et al. |
| 2015/0269383 | A1 | 9/2015 | Lang et al. |
| 2015/0288709 | A1 | 10/2015 | Singhal et al. |
| 2015/0324559 | A1 | 11/2015 | Boss et al. |
| 2015/0324563 | A1 | 11/2015 | Deutschmann et al. |
| 2015/0350902 | A1 | 12/2015 | Baxley et al. |
| 2016/0021117 | A1 | 1/2016 | Harmon et al. |
| 2016/0036844 | A1 | 2/2016 | Kopp et al. |
| 2016/0078362 | A1 | 3/2016 | Christodorescu et al. |
| 2016/0092774 | A1 | 3/2016 | Wang et al. |
| 2016/0164922 | A1 | 6/2016 | Boss et al. |
| 2016/0226914 | A1 | 8/2016 | Doddy et al. |
| 2016/0232353 | A1 | 8/2016 | Gupta et al. |
| 2016/0261621 | A1 | 9/2016 | Srivastava et al. |
| 2016/0277360 | A1 | 9/2016 | Dwyier et al. |
| 2016/0277435 | A1 | 9/2016 | Salajegheh et al. |
| 2016/0286244 | A1 | 9/2016 | Chang |
| 2016/0300049 | A1 | 10/2016 | Guedalia et al. |
| 2016/0308890 | A1 | 10/2016 | Weilbacher |
| 2016/0330219 | A1 | 11/2016 | Hasan |
| 2016/0335865 | A1 | 11/2016 | Sayavong et al. |
| 2016/0371489 | A1 | 12/2016 | Puri et al. |
| 2017/0032274 | A1 | 2/2017 | Yu et al. |
| 2017/0053280 | A1 | 2/2017 | Lishok et al. |
| 2017/0063888 | A1 | 3/2017 | Muddu et al. |
| 2017/0070521 | A1 | 3/2017 | Bailey et al. |
| 2017/0104790 | A1 | 4/2017 | Meyers et al. |
| 2017/0116054 | A1 | 4/2017 | Boddhu et al. |
| 2017/0155669 | A1 | 6/2017 | Sudo et al. |
| 2017/0230418 | A1 | 8/2017 | Amar et al. |
| 2017/0255938 | A1 | 9/2017 | Biegun et al. |
| 2017/0279616 | A1 | 9/2017 | Loeb et al. |
| 2017/0286671 | A1 | 10/2017 | Chari et al. |
| 2017/0331828 | A1 | 11/2017 | Caldera et al. |
| 2018/0004948 | A1 | 1/2018 | Martin et al. |
| 2018/0018456 | A1 | 1/2018 | Chen et al. |
| 2018/0024901 | A1 | 1/2018 | Tankersley et al. |
| 2018/0025273 | A1 | 1/2018 | Jordan et al. |
| 2018/0081661 | A1 * | 3/2018 | Gonzalez del Solar ................... |
| | | | G06F 16/951 |
| 2018/0082307 | A1 | 3/2018 | Ochs et al. |
| 2018/0091520 | A1 | 3/2018 | Camenisch et al. |
| 2018/0121514 | A1 | 5/2018 | Reisz et al. |

(56) References Cited

U.S. PATENT DOCUMENTS

| | | |
|---|---|---|
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191857 A1 | 7/2018 | Schooler et al. |
| 2018/0248863 A1 | 8/2018 | Kao et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0052660 A1 | 2/2019 | Cassidy et al. |
| 2019/0289021 A1 | 9/2019 | Ford |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0089692 A1 | 3/2020 | Tripathi et al. |
| 2020/0334025 A1* | 10/2020 | Wang ................ H04L 67/34 |

OTHER PUBLICATIONS

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Marinescu, Dan C., Cloud Computing and Computer Clouds, University of Central Florida, 2012, pp. 1-246.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

* cited by examiner

CONTAINERIZED INFRASTRUCTURE FOR DEPLOYMENT OF MICROSERVICES

BACKGROUND OF THE INVENTION

Field of the Invention

The present invention relates in general to the field of computers and similar technologies, and in particular to software utilized in this field. Still more particularly, the present invention relates to a method, system and computer-usable medium for containerized deployment of microservices.

Description of the Related Art

In providing for products or services, such as software applications, which run on information handling systems or computing systems, different microservices may be used. Microservices typically use multiple external dependencies, such as libraries and tools, that can change over time, making it difficult to repeatably and consistently deploy the use of the same versions. In addition, versions of microservices, can change over time, which can affect replication or duplication for future releases and deployments.

To assure consistent configurations throughout various stages of the product or service, it is imperative that the same configuration using the same versions of software code or microservice be implemented. This assures proper deployment throughout the various stages, including accurately debugging configurations implemented on different environments.

Assuring correct versions can become more problematic, when such software code or microservices, are not in the control of a developer(s) implementing and providing the services or products that are run on the information handling systems or computing systems.

In certain cases, microservices can have various external dependencies, such as libraries and tools, which have version pinning models used to reference to correct versions; however, there can be problems. The pinning models can be incomplete. For example, only top level dependencies are pinned to. Such solutions may be dependent on retrieving pinned dependencies from other third party external resources at deployment. There may be reliance on external resources being available. There may be reliance on a deployment system having or obtaining all the necessary pre-requisites.

SUMMARY OF THE INVENTION

A method, system and computer-usable medium for containerized deployment of microservices is described. One or more microservices are accessed to develop a product or service. Artifacts related to particular versions of the one or more microservices are determined. An immutable container of the artifacts is created and provided to one more environments using the same configuration of the product or service. The container is deployed in the environments during release of the product or service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for containerized deployment of microservices. In certain implementations, containers or containerized artifacts related to particular versions of microservices or modules of code are provided, such as the same and consistent versions are provided. Such containers and artifacts can be deployed at various stages of a product or service, assuring consistent configuration. Therefore, the same versions can be deployed at the various stages, in different environments, that can include development environment, integration environment, operations environment, and customer environment. When installing, debugging, and troubleshooting take place at any of the environments, there is an assurance that the same configuration has been deployed at the other environments. In other words, it is assured that the same modules and code are being used and have not changed from one environment to another. Consistency and repeatability are provided with the containerized deployment of microservices.

For the purposes of this disclosure, a computing device or an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
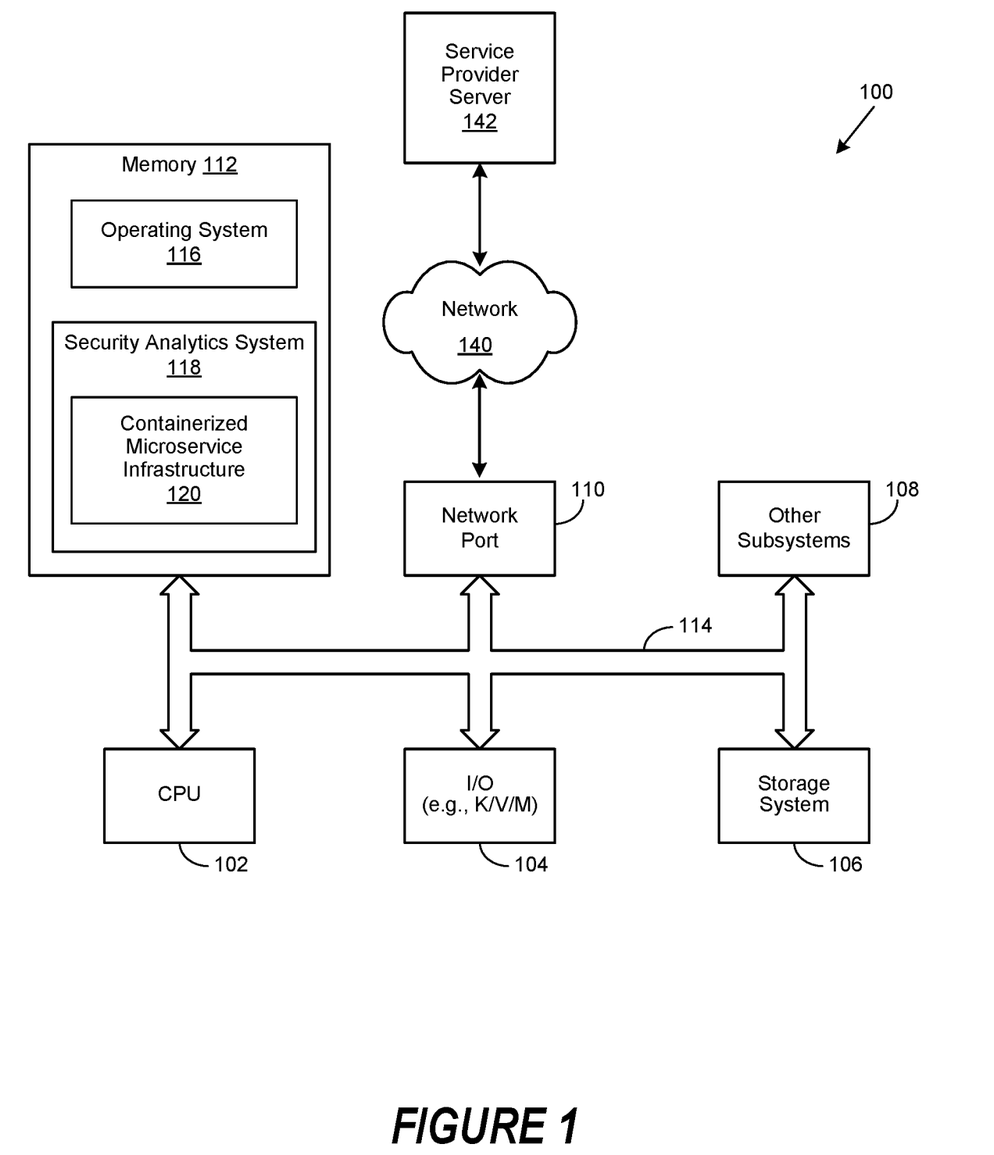
FIG. 1 depicts an example information handling system that can be used to implement the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a cloud service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general-purpose computing device. Moreover, the implementation of the security analytics system 118 on the information handling system 100 improves the functionality of the information handling system 100 and provides a useful and concrete result of performing security analytics functions to mitigate security risk. In certain embodiments, the security analytics system 118 may be implemented to include a containerized microservices infrastructure 120. In certain embodiments, the containerized microservices infrastructure 120 perform various microservice operations, such as in the form of software applications, described in greater detail herein. As described herein, the containerized microservices infrastructure 120 includes immutable or unchanging deployment artifacts which provides for a repeatable and consistent configuration to be used at various stages of the product or service, where the product or service is a software application. The repeatable and consistent configuration is used for different environments, such as development, integration, operations, and customer.

Figure 2:
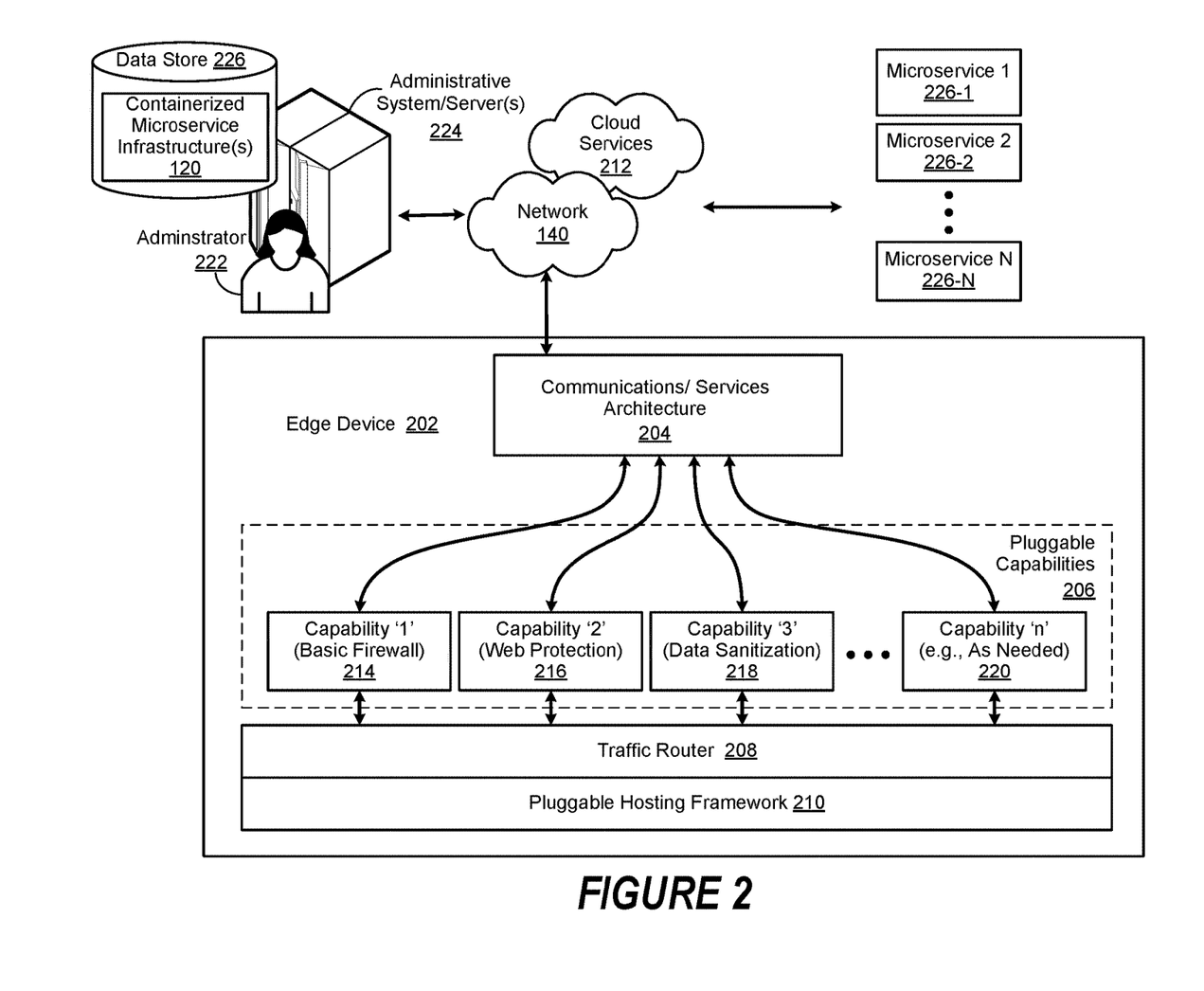
FIG. 2 depicts a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point or gateway into a network 140. Examples of such edge devices 202 may include routers, routing switches, integrated access devices (IADs), multiplexers, wide-area network (WAN) access devices, and network security appliances, and a cybersecurity system or part of a cybersecurity system. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 206, a traffic router 208, and a pluggable hosting framework 210. In certain embodiments, the communications/services architecture 204 may be implemented to provide access to and from various networks 140, cloud services 212, or a combination thereof. In certain embodiments, the cloud services 212 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 210 may be implemented to host such capabilities in the form of pluggable capabilities 206. In certain embodiments, the pluggable capabilities 206 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with the containerized microservices infrastructure 120.

In certain embodiments, the pluggable capabilities 206 may be sourced from various cloud services 212. In certain embodiments, the pluggable hosting framework 210 may be implemented to provide certain computing and communication infrastructure components, and foundation capabilities, required by one or more of the pluggable capabilities 206 In certain embodiments, the pluggable hosting framework 210 may be implemented to allow the pluggable capabilities 206 to be dynamically invoked. Skilled practitioners of the art will recognize that many such embodiments are possible. Accordingly, the foregoing is not intended to limit the spirit, scope or intent of the invention.

In certain implementations, an administrator(s) 222, such as a software application developer(s) connects with the network 140 through an administrative system represented by administrative server 224. Administrator 222 can control or have responsibility for one more containerized microservice infrastructure(s) 120 which can be stored in a data store 226. In particular, the one more containerized microservice infrastructure(s) 120 can be archived and made available to different information handling systems, such as edge device 202.

Various microservices, may be available at various locations, including websites, data repositories, etc. In certain implementations, microservices can be provided through cloud services, such as cloud services 212. Microservices can provide a software development technique, which is a variant of a service-oriented architecture (SOA) structural style, arranging an application, such as a software application developed as a product or service, as a collection of loosely coupled services. The use of open source modules can be implemented as part of such microservices. Microservice 1 226-1, microservice 2 226-2 to microservice N 226-N represented such microservices and are accessible through network 140.

Figure 3:
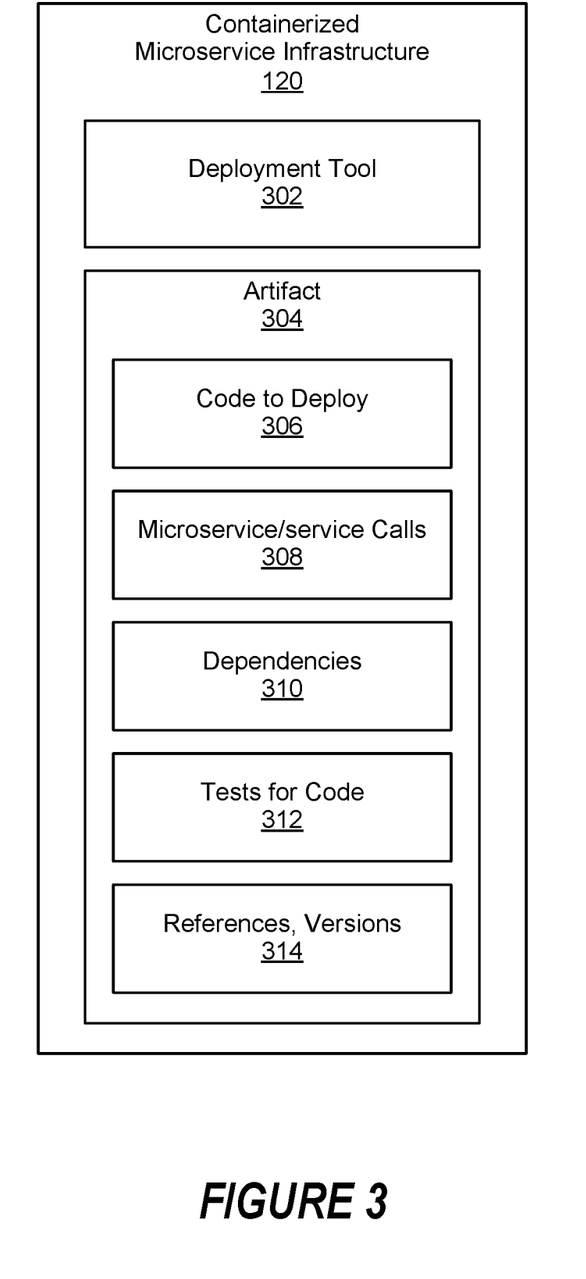
FIG. 3 depicts an example containerized microservice infrastructure.

FIG. 3 is an example of a containerized microservice infrastructure. As discussed herein, the containerized microservice infrastructure 120 is immutable or unchanging, assuring repeatable and consistent configurations for various environments and stages. Therefore, the same and consistent versions of modules or code can be provided for other releases, assisting in deployment and debugging.

In certain implementations, a platform as a service or PaaS, such as Docker can be implemented, where PaaS is a method used by a provider, such as administrator 220 of FIG. 2 to deliver deployment and management capabilities to the end user. A container is a solution to provide such to the end user. Such container technologies are immune to external dependency changes. In certain implementations, the container is implemented as a Node Package Manager or NPM package, as part of an NPM package manager used for JavaScript programming language.

The container or deployment package as represented by containerized microservice infrastructure 120 is used for deployment code and is ran at during release of a product or service assuring the correct version or copy. In an implementation, the containerized microservice infrastructure 120 is called during deployment or implementation of a product or service on an environment (i.e., information handling system).

The containerized microservice infrastructure 120 and its contents, including artifacts can be stored at various locations, including the data store 226 and websites/sites, and shared/stored at other locations, including portable storage devices, such as USB drives.

In certain embodiments, the containerized microservice infrastructure 120 includes a deployment tool 302, used for deploying code during release. One or more artifacts as represented by artifact 304 is/are included as part of a container or containerized microservice infrastructure 120. The artifact(s) 304 in the containerized microservice infrastructure 120 (container/deployment package) is/are immutable or never change.

In certain embodiments, the artifact(s) 304 includes code to deploy microservice(s)/service(s) 306, microservice(s)/service(s) calls 308, dependencies 310, tests for code 312, and references/versions 314. as to the artifact(s) 304.

Figure 4:
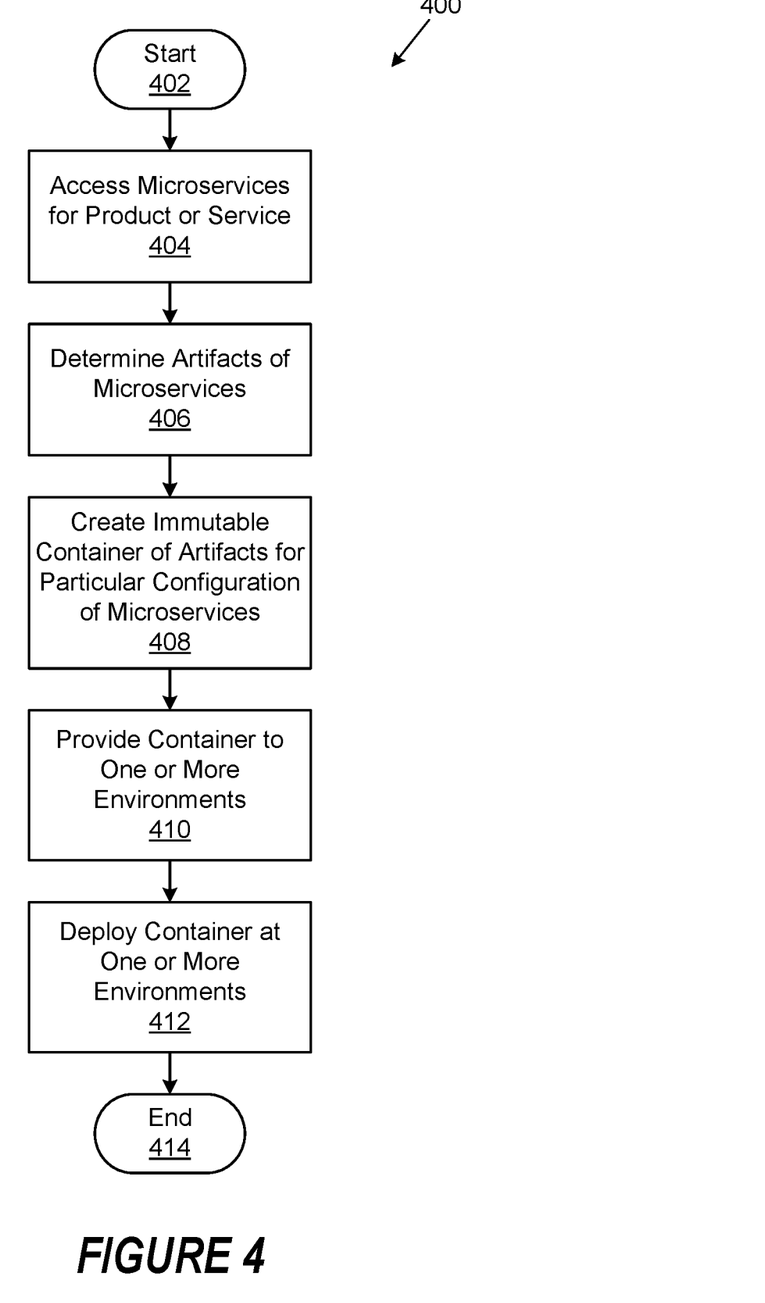
FIG. 4 is generalized flowchart for providing containerized deployment of microservices.

FIG. 4 is generalized process flow 400 for containerized deployment of microservices. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At block 402, the process 400 starts. At step 404, one or more microservices are accessed in order to develop a product or service, such as software application. The product or service is used on an information handling system, such as an edge device describe herein. The one or more microservices as accessed at various locations, including websites, data depositories and cloud services.

At step 406, a determination is made as to the artifacts of the microservices. In particular, the artifacts are related to certain versions and can include code to deploy microservice(s)/service(s), microservice(s)/service(s) calls, dependencies, tests for code, etc. The artifacts are immutable or do not change.

At step 408, a container of the artifacts is created. The container is immutable and does not change. The container is specific to a particular configuration. As described herein, the container can be implemented through a platform as a service or PaaS and implemented as an NPM package.

At step 410, the container is deployed to one or more environments. As discussed herein, the same configuration is used for different environments, such as environments at various stages of the product or service. The container can be provided from various locations, including a developer/administrator controlled data store.

At step 412, deployment of the container is performed at the one or more environments. As discussed herein, the deployment of the container takes place during deployment of the product or service. As further discussed, the container includes a deployment tool and all the necessary resources to run the deployments, as included in the artifacts, such as deploy microservice(s)/service(s), microservice(s)/service(s) calls, dependencies, tests for code, etc. At block 414, the process 400 ends.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for containerized deployment of microservices comprising:
   determining artifacts related to particular versions of the one or more microservices; wherein the artifacts are related to particular versions of code and include one or more of the particular versions of code to deploy the microservices, microservice calls, dependencies, and tests for code;
   creating an immutable container of the artifacts that includes a deployment tool;
   providing the immutable container to one or more environments using the same configuration of the product or service;
   deploying the immutable container at the one or more environments.

2. The method of claim 1, wherein immutable container is implemented through a Platform as a Service.

3. The method of claim 1, wherein the immutable container is implemented as Node Package Manager package.

4. The method of claim 1, wherein the providing the immutable container is performed at various stages of the product or service.

5. The method of claim 1, wherein the deploying the immutable container is performed when the product or service is released.

6. The method of claim 1, wherein the deploying of the immutable container is performed using a deployment tool included in the immutable container at release of the product or service.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
determining artifacts related to particular versions of the one or more microservices, wherein the artifacts are related to particular versions of code and include one or more of the particular versions of code to deploy the microservices, microservice calls, dependencies, and tests for code;
creating an immutable container of the artifacts that includes a deployment tool;
providing the immutable container to one or more environments using the same configuration of the product or service;
deploying the immutable container at the one or more environments.

8. The system of claim 7, wherein immutable container is implemented through a Platform as a Service.

9. The system of claim 7 wherein the immutable container is implemented as Node Package Manager package.

10. The system of claim 7, wherein the providing the immutable container is performed at various stages of the product or service.

11. The system of claim 7, wherein the deploying the immutable container is performed when the product or service is released.

12. The system of claim 7, wherein deploying of the immutable container is performed using a deployment tool included in the immutable container at release of the product or service.

13. A non-transitory, computer-readable storage medium embodying computer program code, the computer program code comprising computer executable instructions configured for:
accessing one or more microservices are accessed to develop a product or service;
determining artifacts related to particular versions of the one or more microservices, wherein the artifacts are related to particular versions of code and include one or more of the particular versions of code to deploy the microservices, microservice calls, dependencies, and tests for code;
creating an immutable container of the artifacts that includes a deployment tool;
providing the immutable container to one or more environments using the same configuration of the product or service;
deployment the immutable container at the one or more environments.

14. The non-transitory, computer-readable storage medium of claim 13, wherein immutable container is implemented through a Platform as a Service.

15. The non-transitory, computer-readable storage medium of claim 13, wherein the providing the immutable container is performed at various stages of the product or service.

16. The non-transitory, computer-readable storage medium of claim 13, wherein the deploying the immutable container is performed when the product or service is released.

17. The non-transitory, computer-readable storage medium of claim 13, wherein the deploying of the immutable container is performed using a deployment tool included in the immutable container at release of the product or service.

* * * * *